United States Patent
Kryskow, Jr.

(10) Patent No.: US 6,763,389 B2
(45) Date of Patent: Jul. 13, 2004

(54) MULTIPLE MANAGEMENT SYSTEM AND METHOD

(75) Inventor: Joseph M. Kryskow, Jr., Hudson, NH (US)

(73) Assignee: Infrastructure Innovations, LLC, Boston, MA (US)

( * ) Notice: Subject to any disclaimer, the term of this patent is extended or adjusted under 35 U.S.C. 154(b) by 0 days.

(21) Appl. No.: 10/222,210

(22) Filed: Aug. 16, 2002

(65) Prior Publication Data

US 2003/0055973 A1 Mar. 20, 2003

Related U.S. Application Data

(63) Continuation of application No. PCT/US01/04873, filed on Feb. 16, 2001.
(60) Provisional application No. 60/183,695, filed on Feb. 18, 2000.

(51) Int. Cl.[7] .............................................. G06F 15/16
(52) U.S. Cl. ........................... 709/229; 709/225; 707/9; 713/201
(58) Field of Search ................................. 709/203, 229, 709/225; 707/9, 10; 713/166, 201; 370/235, 236.1

(56) References Cited

U.S. PATENT DOCUMENTS

| | | | |
|---|---|---|---|
| 5,185,780 A | 2/1993 | Leggett | 379/265.08 |
| 6,046,980 A | 4/2000 | Packer | 370/230 |
| 6,058,102 A | 5/2000 | Drysdale et al. | 370/252 |
| 6,073,175 A | 6/2000 | Tavs et al. | 709/226 |
| 6,104,727 A | 8/2000 | Moura et al. | 370/468 |
| 6,147,975 A * | 11/2000 | Bowman-Amuah | 370/252 |
| 6,195,697 B1 * | 2/2001 | Bowman-Amuah | 709/224 |
| 6,434,607 B1 * | 8/2002 | Haverstock et al. | 709/217 |

* cited by examiner

*Primary Examiner*—John E. Breene
*Assistant Examiner*—Cheryl Lewis
(74) *Attorney, Agent, or Firm*—Ware, Fressola, Van Der Sluys & Adolphson LLP (57) ABSTRACT

A method of automatically identifying and setting the level of management access privilege that is given to any one network management system in a multiple management system environment, where network bandwidth and service types are provided by one or more service level agreements (SLAs) by monitoring multiple components of the network so as to identify the current status of multiple service level agreements; by determining the current scale and scope of the network; and by automatically adjusting a service level agreement based on the current scale and scope of the network in view of the status of the multiple service level agreements.

19 Claims, 14 Drawing Sheets

FIG. 2 TYPICAL DEPLOYMENT

MULTIPLE MANAGEMENT SYSTEM AND METHOD

CROSS REFERENCE TO RELATED APPLICATIONS

This application is a continuation of International Application No. PCT/US01/04873 having an international filing date of Feb. 16, 2001, and from which priority is claimed under all applicable sections of Title 35 of the United States Code including, but not limited to, Sections 120, 363 and 365(c), and which in turn claims priority under 35 USC §119(e) to U.S. Provisional Patent Application Serial No. 60/183,695 filed on Feb. 18, 2000.

The present application discloses subject matter which is disclosed and may be claimed in the following international applications as identified by PCT/US01/05119, PCT/US01/05021, PCT/US01/05120 and PCT/US01/04876.

Application No. PCT/US01/05119 filed Feb. 16, 2001, is directed to a closed loop method for baselining business bandwidth in a network environment.

Application No. PCT/US01/05021 filed Feb. 16, 2001, is directed to active monitoring of business bandwidth.

Application No. PCT/US01/05120 filed Feb. 16, 2001, is directed to analysis of business bandwidth for control of same.

Application No. PCT/US01/04876 filed Feb. 16, 2001, is directed to the application of closed loop control to control of business bandwidth.

TECHNICAL FIELD

The present invention is directed to applying closed loop methodologies for automatically identifying and setting the level of management access privileges given to any one network management system (in a multiple management system environment). Specifically it is directed to the ability to adjust the specific type of management interaction, the amount/volumes of those interactions in any given period of time, and the specific types of information obtained. The ability to set the level of management privileges is driven by two major motivations as set forth below.

BACKGROUND ART

Management accesses privileges with respect to networks deal with various parameters of a network. For instance, access privileges may deal with the level of security access to sensitive information, whether the user can make configuration changes to the network, as well as the amount of management interaction with the network which might potentially interfere with critical resources. The present invention is directed to providing automatic identification and setting of the level of management access privileges given to any one network management system forming part of a multiple management system environment.

DISCLOSURE OF THE INVENTION

The primary purpose for this invention is to create an automated control process that manages the distribution of (and access to) service monitoring and analysis data.

The specific elements of the control process are processes that limit a customer's (user's) access to specific monitored data and analysis results primarily based on:

The management system's ability, in real time, to collect and create a unique report for that specific customer's data which identifies the key parameters being measured.

Service level agreement for that customer.

Management and network state (e.g., if there is any available management bandwidth to process and pass on the information requests).

Added to the above elements are the traditional security and access control feature, including specific authorization level access lists, passwords, and configured filters for specific information types.

Thus, as a customer's SLA changes, the system automatically distributes the appropriate changes to the management control system identifying the changed "data" to which the customer has access.

Thus, the present invention is directed to applying closed-loop methodology for automatically identifying and setting the level of management access privileges given to any one network management system. In order to accomplish this task, the method monitors multiple components within the network in order to automatically characterize and measure multiple service level agreement parameters. By monitoring these parameters, information with respect to the network service providers, and network customers or users is available for analysis. The resulting information can be placed into a specific customer location, either by the service provider, a third party integrator manager or by the customer himself/herself.

Another key component of the method is to have specific configuration information for accessing each section/component of the network as supplied by the proprietor of that component. The automatic nature of the invention is to control the access privileges to service level agreement business bandwidth as driven by various aspects of the network itself. These aspects include the ability of the network to be able to handle the management activity itself without interfering with the user service level agreements, the initial range of control/access given to the management system/user accessing the network, as well as the current service level agreement business bandwidth characteristics as those characteristics are compared to those monitored by the process.

Thus, access to information and control is based on the type of service level agreement that exists between the network service provider and the user and the characterization parameters agreed to be observed that make up the service level agreement, and the agreement of access reached by the management parties, as well as the current state of the network, including end-to-end performance and/or component to component performance. Thus the method for automatically identifying/setting the level of management and access privileges is specifically directed to the ability to adjust the specific type of management interaction, the amount/volumes of those interactions in any given period of time, as well as the specific types of information obtainable. This ability to set the level of management privileges is in turn driven by motivations of both security and potential disturbance to the network. With respect to the security, it is particularly directed to the ability to access sensitive information, as well as what level of control is to be given a user with respect to configuration changes to the network. With respect to the amount of disturbance of the network, limits can be placed with respect to the amount of management interaction with respect to interfering with critical resources of the network, as well as the amount of control to the network insofar as such control might interfere with critical resources.

BEST MODE FOR CARRYING OUT THE INVENTION

Figure 2:
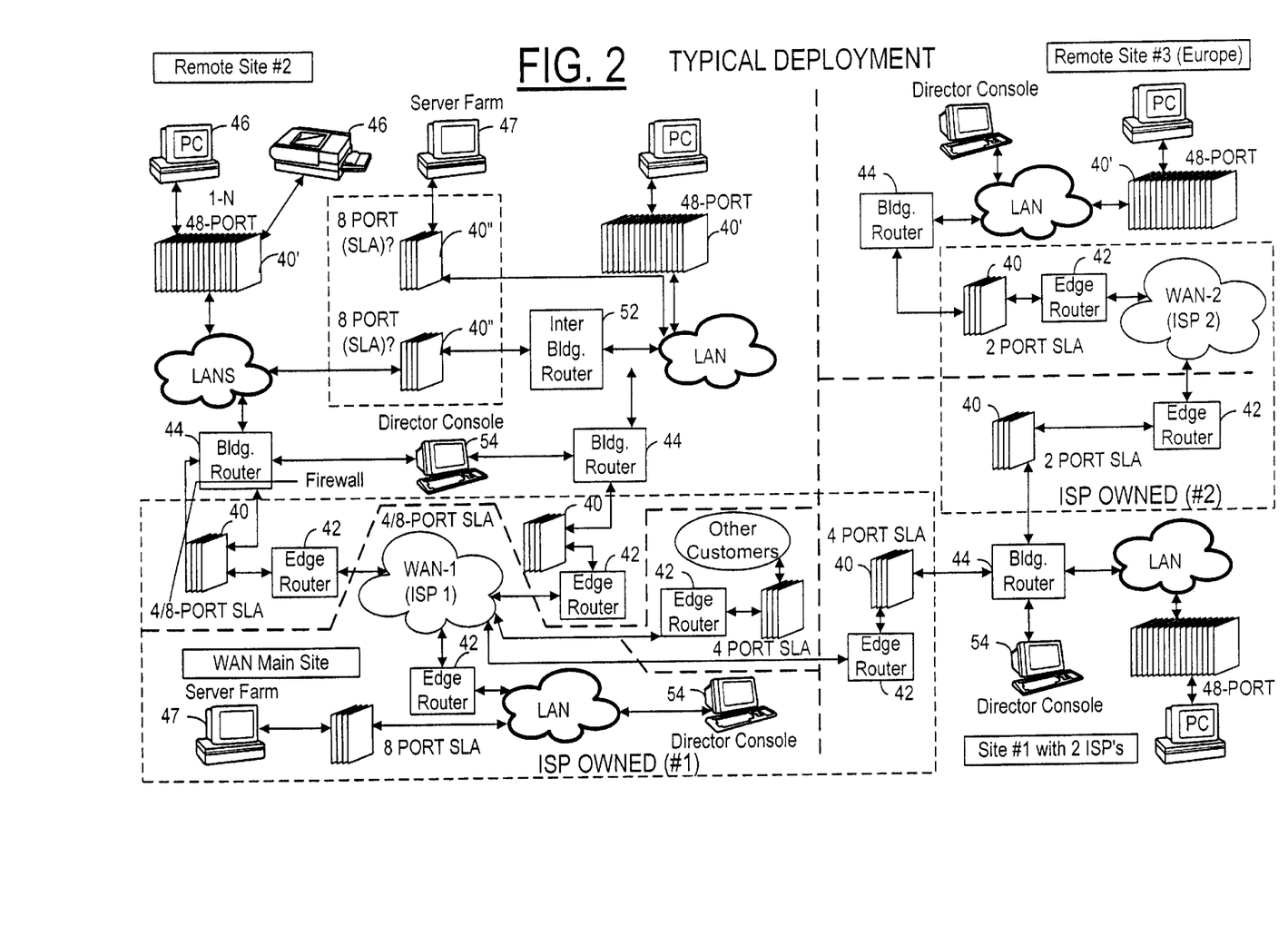
FIG. 2 is an overall diagrammatic representation of a typical deployment environment in which the present invention may be used in which various networks are interconnected for providing bandwidth necessary for implementing one or more service level agreements.

As best seen in FIG. 2, a typical deployment of the present invention comprises a plurality of bandwidth monitoring devices 40, such as edge devices which are typically collocated with edge routers 42 and building routers 44. Edge routers (switch fabric) are typically deployed at the edge of one wide area network (WAN) associated with an internet service provider (ISP) or between a WAN and a local area network (LAN) as shown in FIG. 2. The edge devices (appliances) (bandwidth monitoring devices at the edge of different networks) are positioned so as to monitor bandwidth passing through an edge router typically to a building router 44 from whence the bandwidth is communicated through LANs, ultimately to one or more network enabled devices 46 such as PCs, printers and the like and/or to server farms 47. Depending upon the level of monitoring, a special type of bandwidth monitoring device such as a network enabled device bandwidth monitoring device 40 particularly suited for connection to network enabled devices 46 can be employed. Such monitoring devices typically are positioned between a LAN and a plurality of network enabled devices 46. In addition, server farm bandwidth monitoring devices 40 can be positioned between server farms 47 and LANs or interbuilding routers 52 as shown in FIG. 2.

Figure 5:
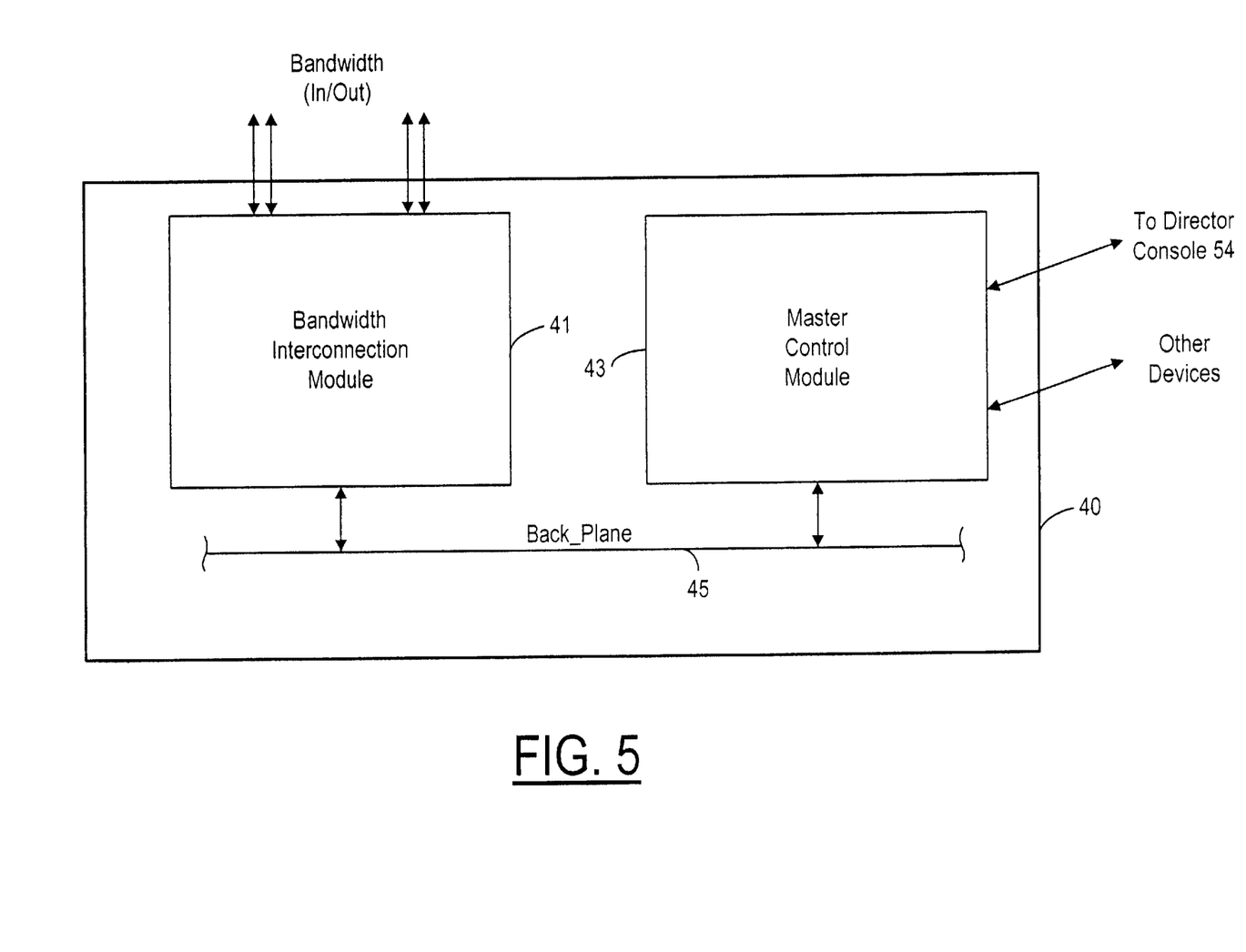
FIG. 5 is a block diagram showing how the bandwidth interconnect module and the master control module are put together to form the bandwidth monitoring device.

As seen in FIG. 5, each bandwidth monitoring device 40 includes a bandwidth interconnection module 41 and a master control module 43. These two modules communicate via a backplane bus 45. The master control module also communicates with one or more director consoles 54.

Figure 3:
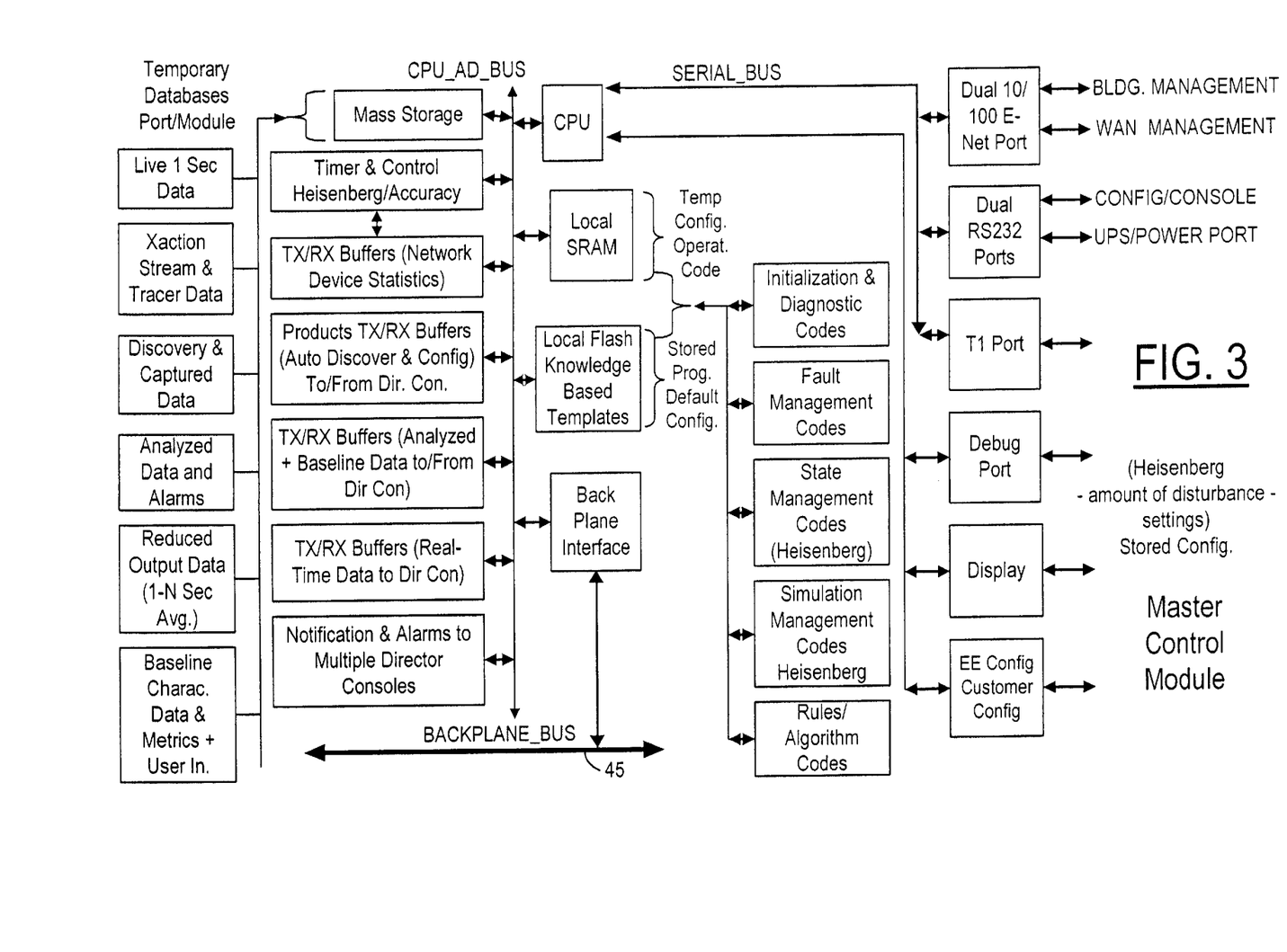
FIG. 3 is a block diagram of the master control module of the bandwidth monitoring device as shown in FIG. 2.
Figure 4:
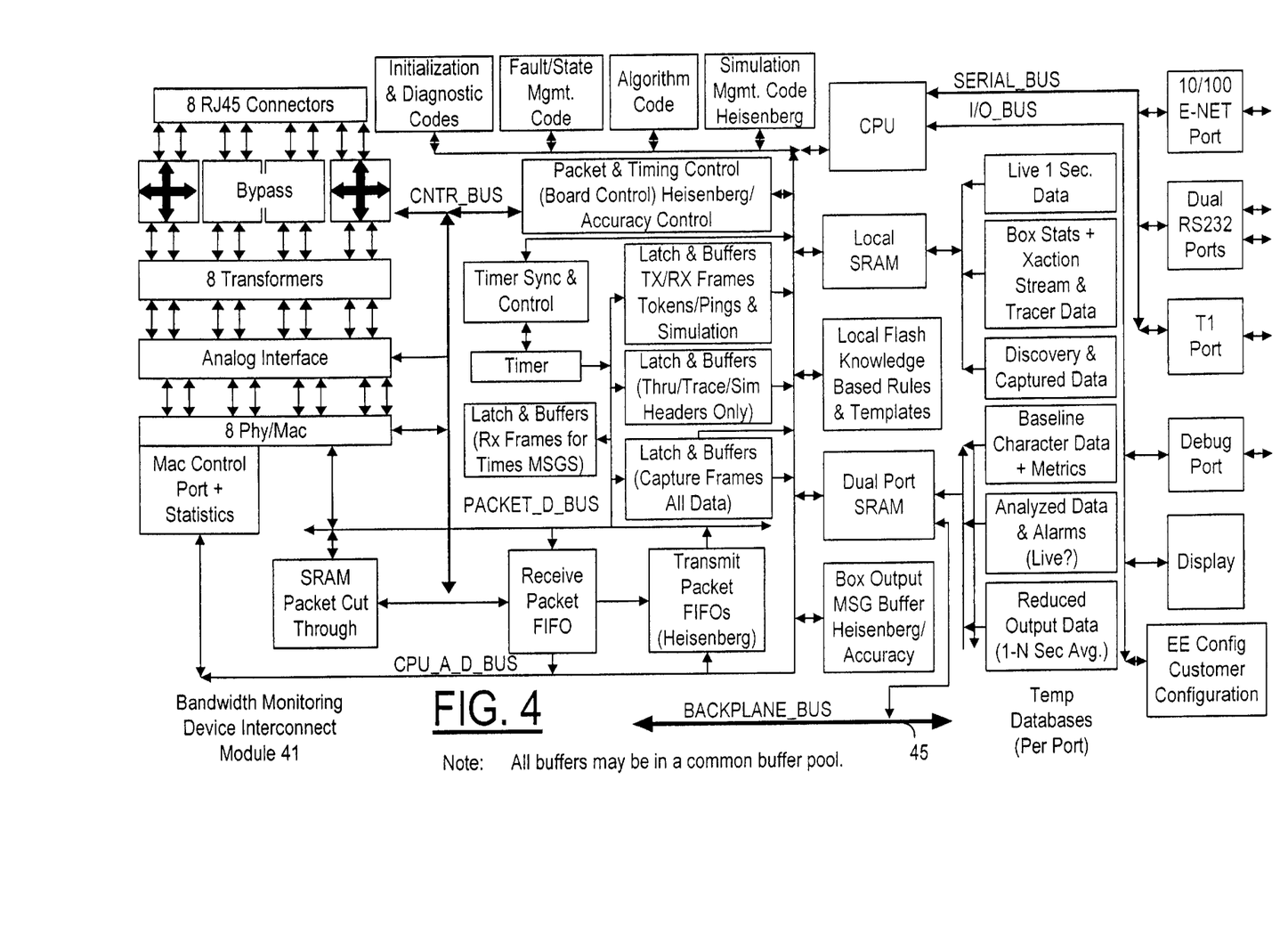
FIG. 4 is a block diagram of the bandwidth monitoring device interconnect module forming part of the bandwidth monitoring device.

As seen in FIGS. 2 and 4, the bandwidth interconnection module 41 has RJ45 type connectors for connection to the network enabled devices 46 and to associated LANs and routers 42, 44. FIG. 4 also shows that each interconnection module captures all network frames and accumulates these frames in temporary databases (per port) (see column identified as Temp Databases). The interconnect module determines if a frame is part of an existing data type(s) and flow(s) or is a new data type/flow, and performs basic data flow statistics management—counts and threshold analysis. As seen in FIG. 3, the master control module 43 associated with the interconnection module 41 retrieves the information in these temporary databases and further analyzes same (see modules entitled "TX/RX Buffers (Network Device Statistics)", "Products TX/RX Buffers (Auto Discover & Config) To/From Dir. Con.", "TX/RX Buffers (Analyzed+ Baseline Data to/From Dir Con)", "TX/RX Buffers (Real-Time Data to Dir Con)" and "Notification & Alarms to Multiple Director Consoles"). The master control module, based upon the network frames monitored by the bandwidth interconnecting module 41, determines the current scale and changes in scale (type of network traffic) at that bandwidth monitoring device 40 and the current scope (amount) and changes in scope of network traffic at that bandwidth monitoring device.

Figure 6:
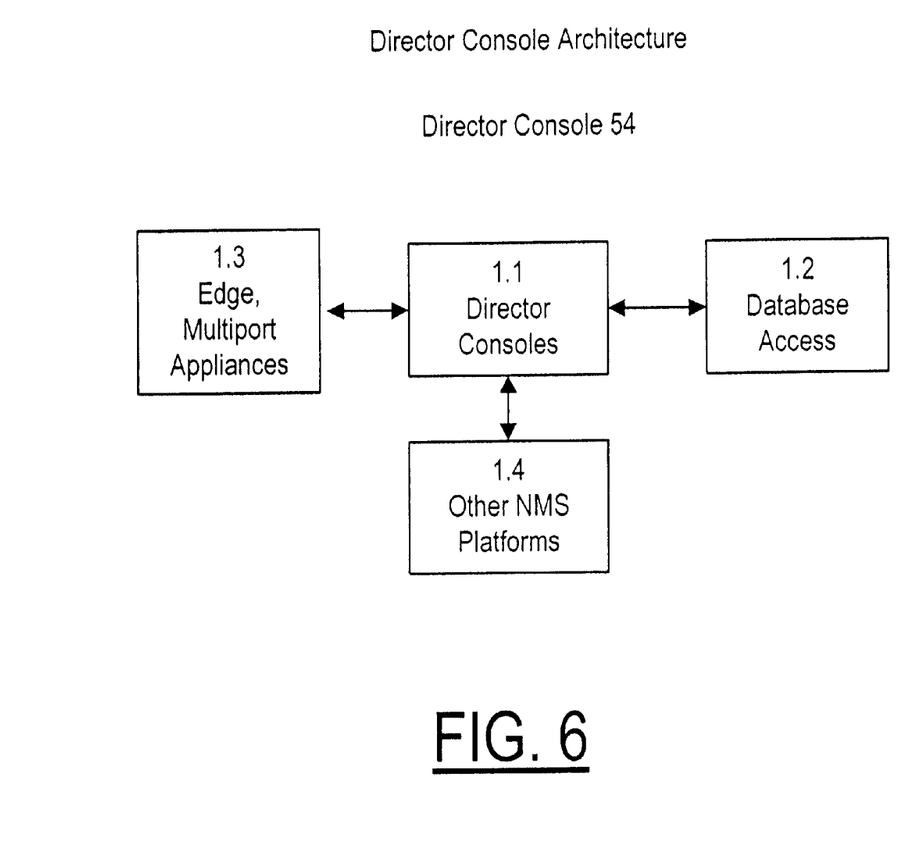
FIG. 6 is a high level block diagram of the director console according to the present invention.
Figure 7:
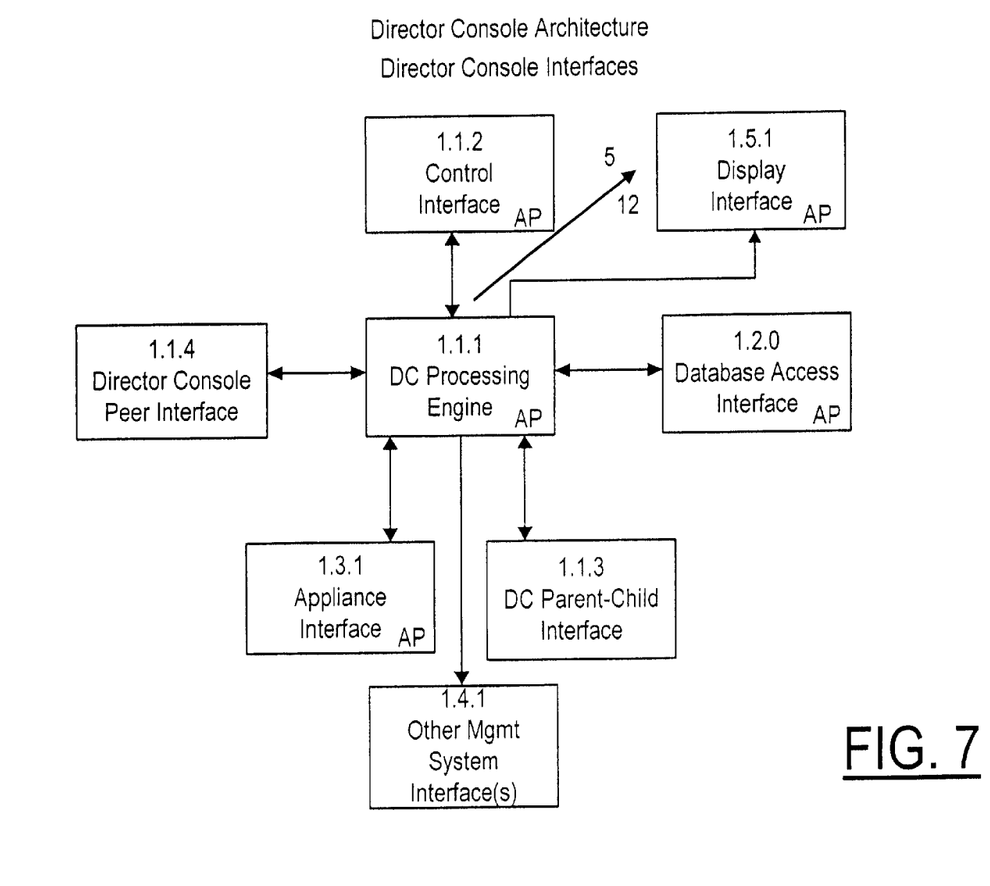
FIG. 7 is a block diagram of the director console interfaces.
Figure 8:
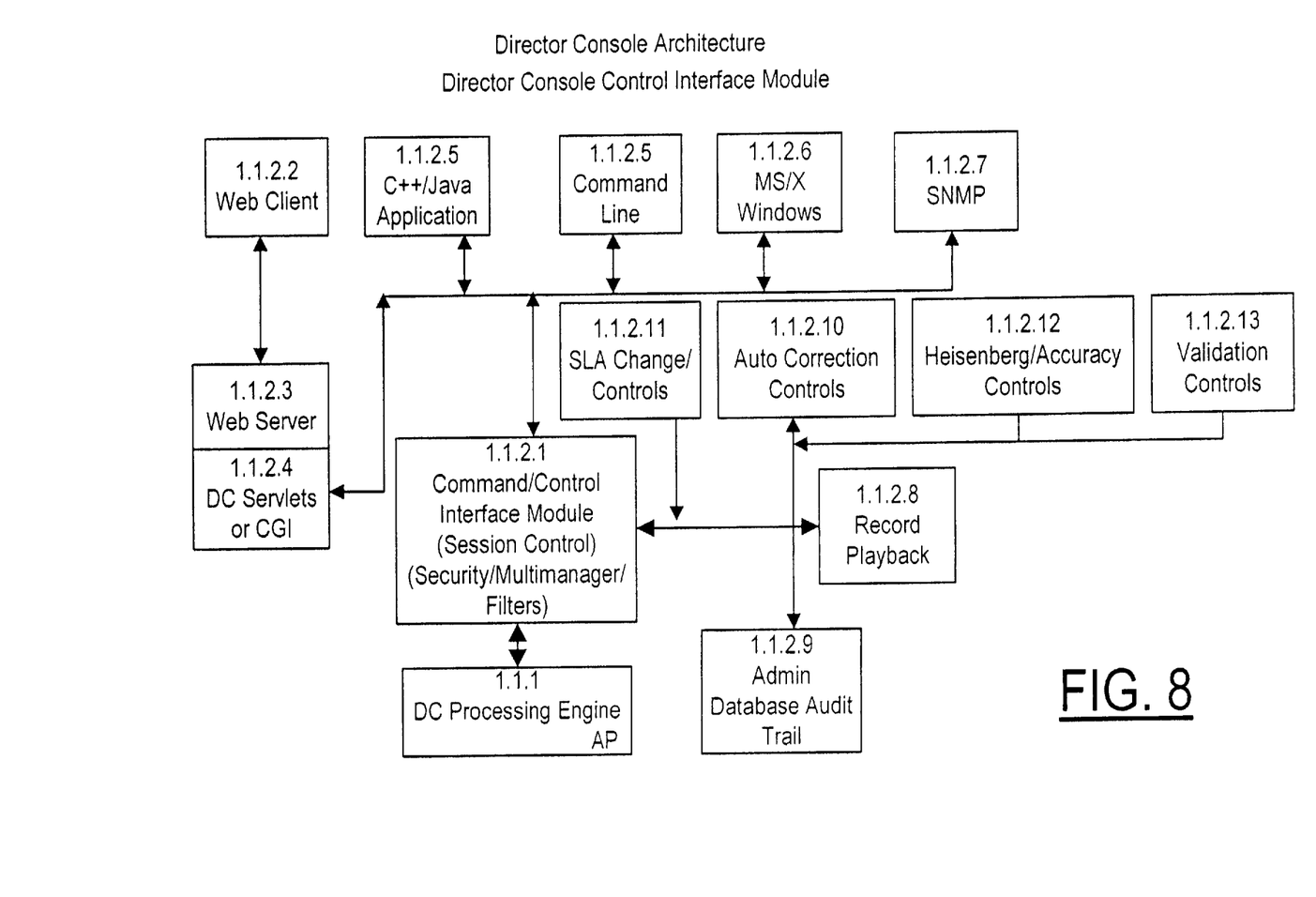
FIG. 8 is a block diagram of the director console control interface module.
Figure 9:
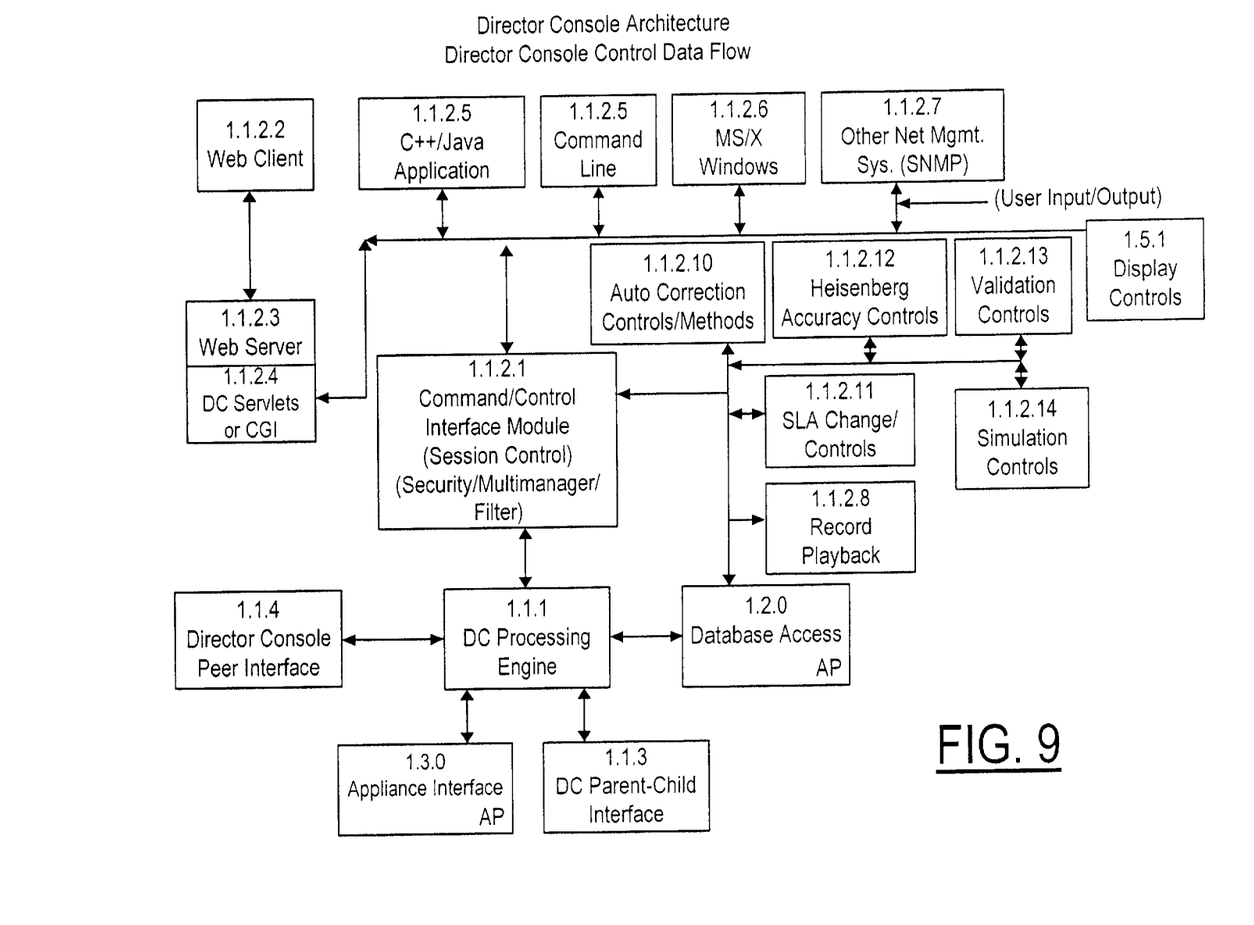
FIG. 9 is a block diagram of the director console control data flow.
Figure 13:
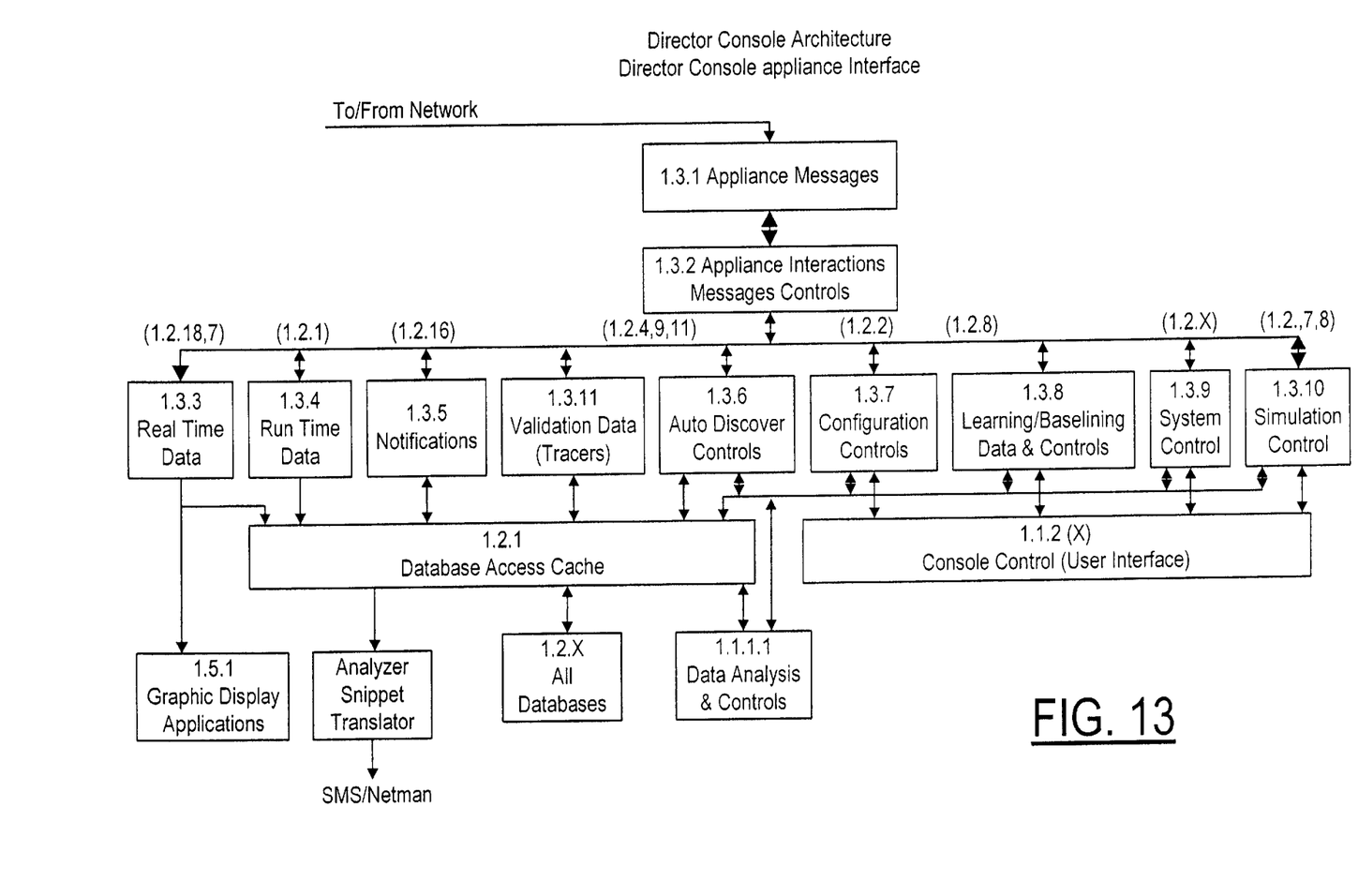
FIG. 13 is a block diagram of the director console architecture for director console appliance interface as used in implementing the present invention.

For the methods according to the present invention to be implemented, in addition to the various types of bandwidth monitoring devices, the present invention further includes one or more director consoles 54 (see FIGS. 6 and 7) which pool and further analyze the bandwidth data associated with the bandwidth monitoring devices. This further analysis of the bandwidth data is seen in FIGS. 8–13. As seen in FIGS. 7 and 13, the director console architecture includes a director console appliance interface which receives, via the TO/FROM Network bus, the master control module network traffic information via the 10/100 network port of the master control module 43 (see FIG. 3). As seen in the row of modules labeled 1.3.3, 1.3.4, 1.3.5, 1.3.11, 1.3.6, 1.3.7, 1.3.8, 1.3.9 and 1.3.10, the director console appliance interface stores the network traffic information from multiple bandwidth monitoring devices according to the type of network traffic. This combined network traffic information is presented to the database access cache 1.2.1 where it is held for temporary storage and access (see FIG. 10).

Figure 10:
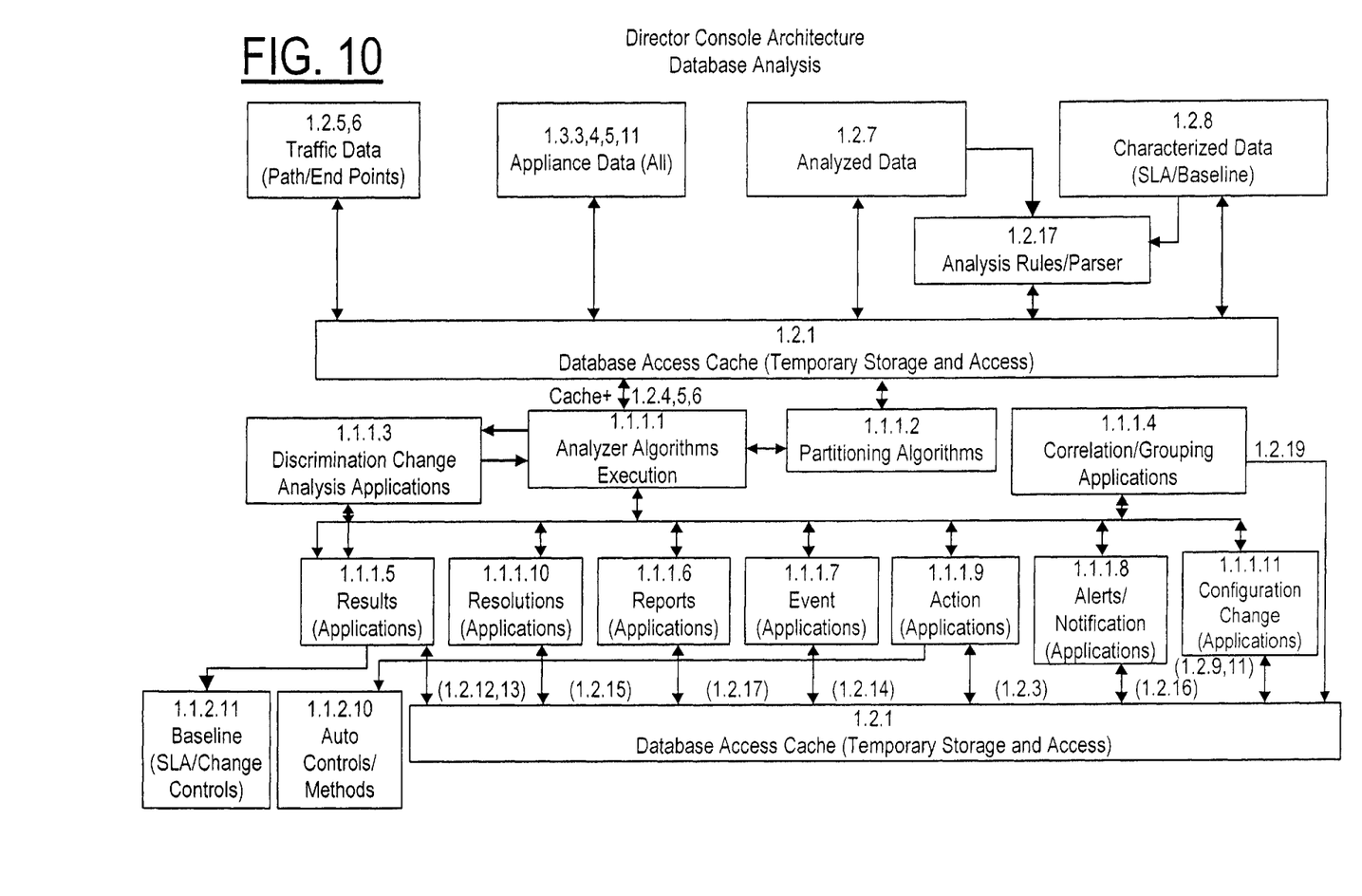
FIG. 10 is a block diagram of the database analysis used with regard to the present invention.
Figure 11:
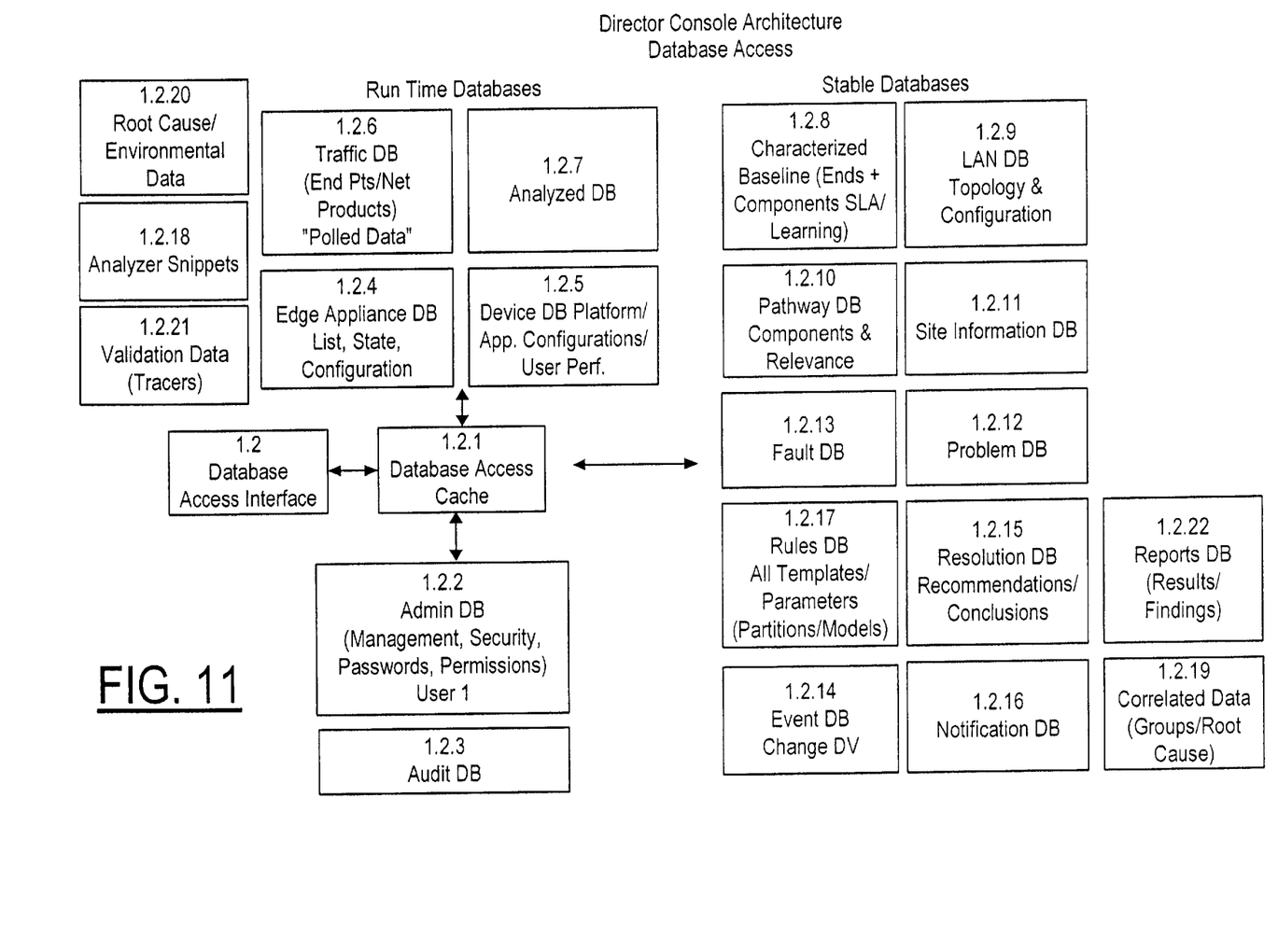
FIG. 11 is a block diagram of database access associated with the method according to the present invention.
Figure 12:
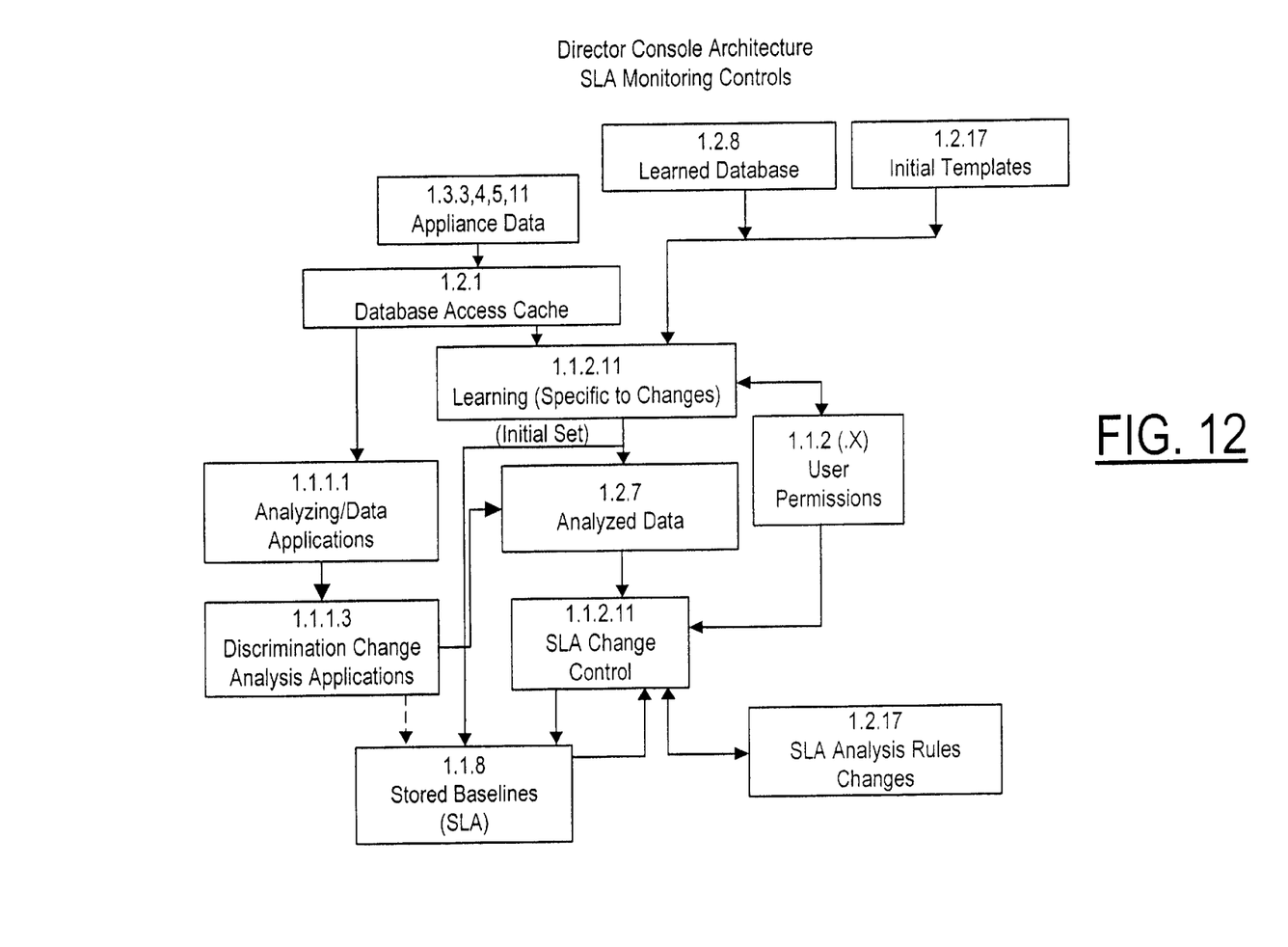
FIG. 12 is a block diagram of the director console architecture for service level agreement monitoring controls.

FIG. 10 shows the detailed block diagram of the control interface (1.1.2) and the database access interface (1.2.0) shown in FIG. 7. As seen in FIG. 10, the network information from multiple bandwidth monitoring devices 40 is accessed from the database access cache 1.2.1 so as to determine the current scale and scope of the network with this scale and scope information stored in modules 1.1.1.5 through 1.1.1.11. Thus the director console pools and analyzes the network information from the bandwidth monitoring devices to determine the current scale and score of all of the monitored network. It further compares the current scale and scope against the previous and desired state and scope of the monitored network.

Figure 1:
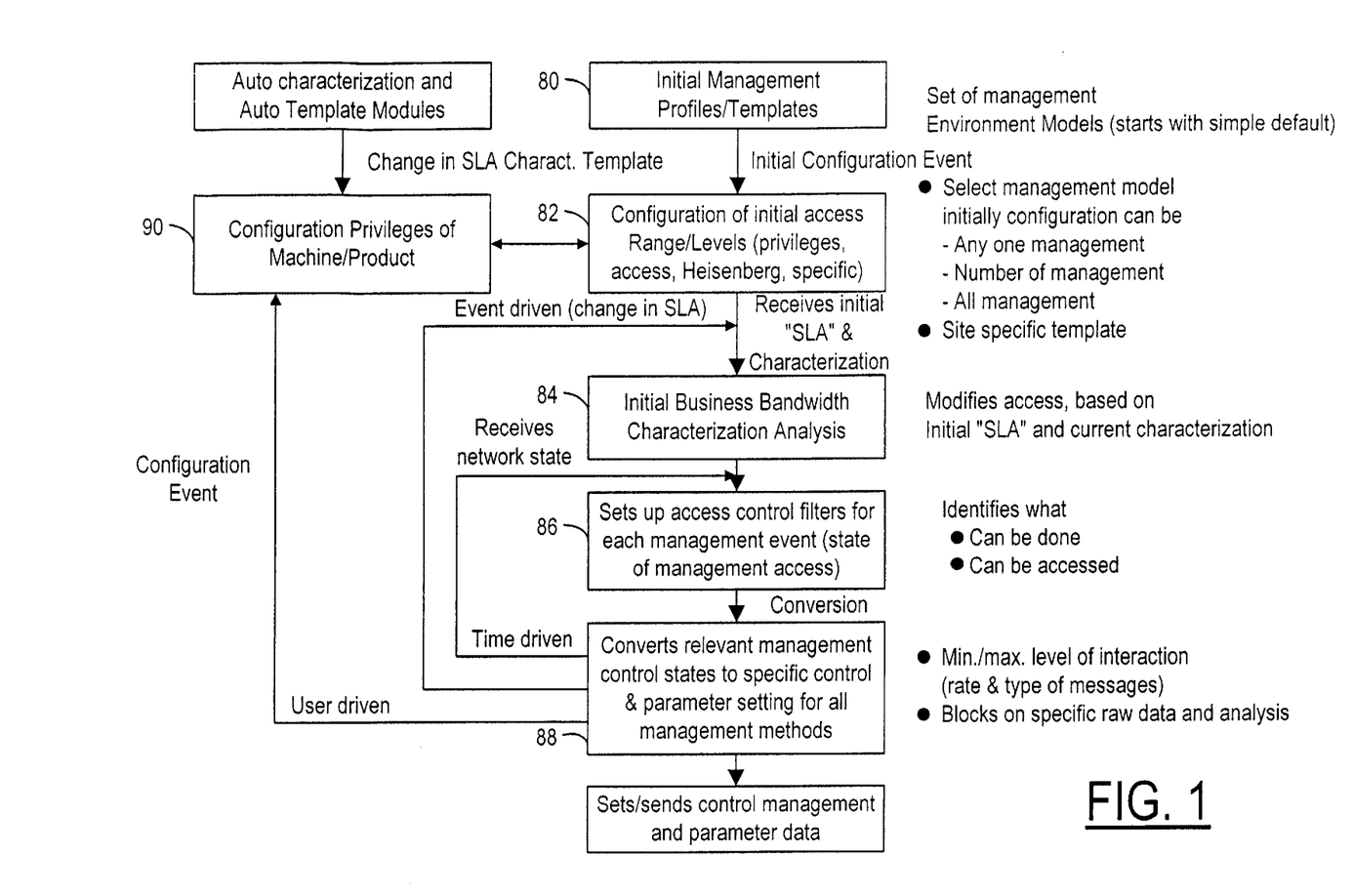
FIG. 1 is an overall flow chart illustrating the steps for implementing a closed loop method for automatically identifying and setting the level of management access privileges given to any one network management system in a multiple management system environment according to the present invention.
Figure 1A:
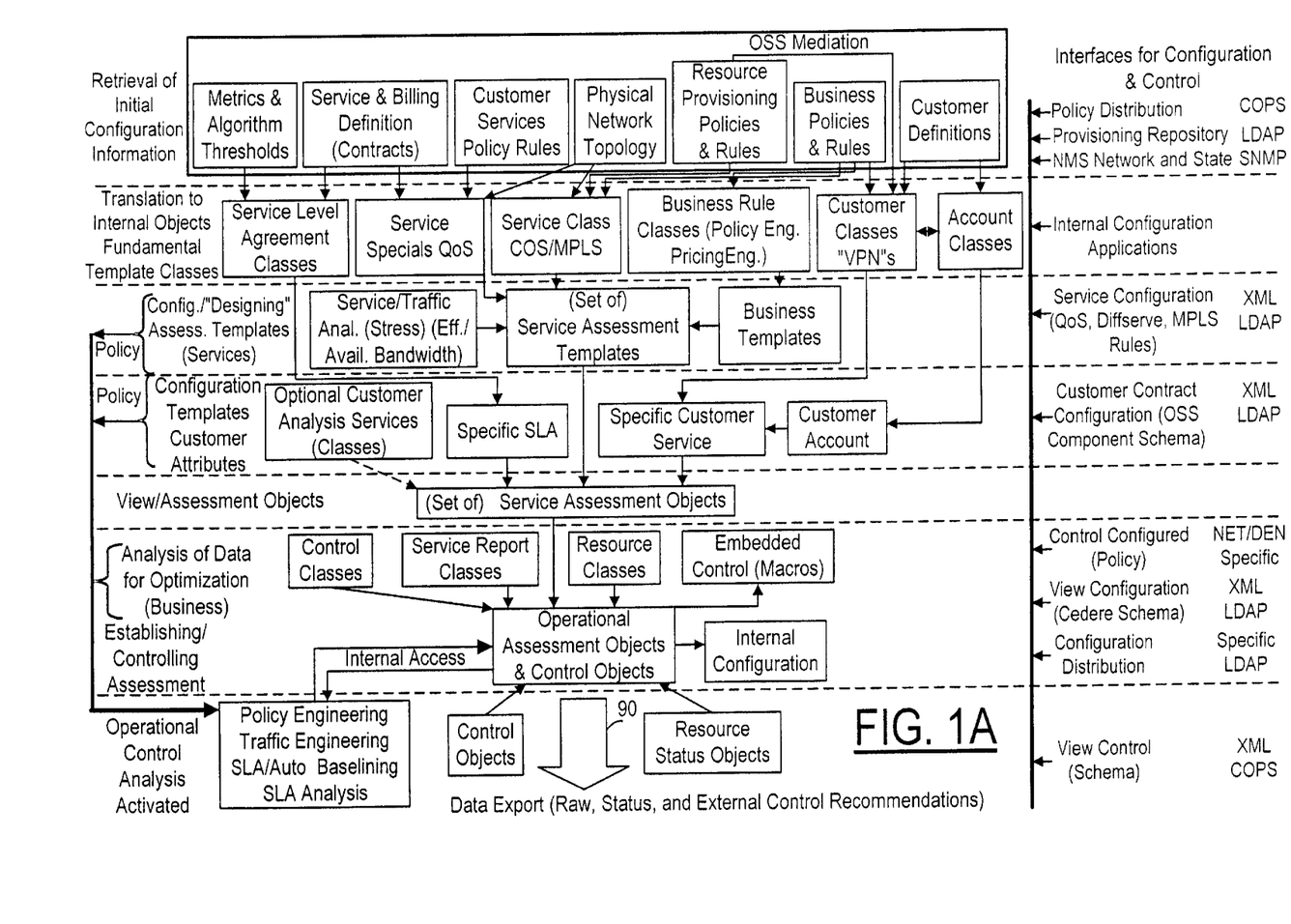
FIG. 1A is an overall flow chart with respect to closed loop methodologies for performing business bandwidth monitoring and control.

It should be noted that FIG. 1 is a typical deployment associated with the methodologies according to the present invention. Limitless other variations can be contemplated. The underlying concept however is for the bandwidth monitoring devices to be associated at locations where communications from one network environment to another is desired to be monitored, such as between a WAN of an internet service provider and an edge router interfaced to a building router associated with an office building and the like. As seen in FIG. 4E, each bandwidth monitoring device 40 includes a bandwidth interconnecting module 41 as shown in FIG. 4 and a master control module 43 as shown in FIG. 3. The master control module can communicate with one or more bandwidth interconnecting modules via backplane bus 45.

With regard to the typical deployment of the bandwidth monitoring devices and director consoles as shown in FIG. 2, the present invention is specifically directed to applying closed loop methodologies for automatically identifying and setting the level of management access privileges which are given to any one network management system in a multiple management system environment. It is specifically directed to allowing for the adjustment of specific types of management interactions, including the amount and volume of those interactions at any given time or period of time, as well as the specific type of information which can be obtained concerning network management activities. These management privileges are in turn motivated by security issues with respect to access sensitive information, as well as to allow configuration changes to the network, as well as the amount of management interaction and control which could potentially interfere with critical resources being provided by the network.

As will be explained more fully with regard to FIG. 1, the method of the present invention provides for the monitoring of multiple components of the network in order to automatically characterize and measure multiple service level agreement parameters. It also provides for monitoring those parameters as they are observed by the network service provider, as well as the network user. It further provides that such information can be presented to a specific user location, either by the service provider, a third party integrator manager or by the user himself/herself. The method further provides that specific configuration information for accessing information for each component of the network can be supplied to the user or party for whom that component is associated.

The automatic nature of the monitoring method and thus for controlling the access privileges to a service level agreement business bandwidth is in turn driven by several aspects of the network itself, including:

the state of the network such as the ability of the network at any given time to be able to handle network activity without interfering with user service level agreements, the initial range of control/access which is to be given to any management system/user accessing the network, and the current service level agreement business bandwidth characteristics that are currently being compared to those monitored by the process according to the present invention.

Thus, accessed information and control is based upon the type of service level agreement that exists between the network provider and the user (customer), as well as the characterization parameters agreed to be observed by the provider and the user and which make up the service level agreement, and further the agreement of access which is reached by the management party and the current state of the network, including end-to-end state and component to component state. As best seen in FIG. 1, the specific points that comprise the closed loop methodology for automatically controlling management access to network management data and controls in a multi-management environment are:

1. Initial Management Model and Template

The initial management model and template is a set of embedded management access control templates that can be assembled based on the management model of the network with an initial default management model selected (see block 80). The templates identify specific access privileges (control settings) of the functions and data (such as all the default selections). Examples of such templates include identification of: internet protocol (IP) addressing, gateway, key services, autodiscovery being in the enabled state, autolearning, including interactive mode being in the enabled state, the amount of disturbance control permitted and the limit of interactions with regard to the end node and network components.

2. User Configuration

The process according to the present invention allows the user to select the specific management model for network management products, the specific management template for each managed component in that model, the specific settings in the template, the access privileges for changing the measurement model/templates by other users and the access privileges and range (such as min/maximum controls) for modifying the management templates by the automatic functions of the management system; such as setting the site's default management template.

3. Auto Adjust Site Template

As seen by blocks 82, 84, 86, 88 and 90, the present invention provides for the ability to adjust setting the controls in the site management template based on the initial/default business bandwidth characterization parameters, as well as the current measurements of those parameters. The examples include situations in which the network load is greater than a predetermined percentage for a specific network component (such as a specific network element or application) in which case no further management control is allowed. Another example is a service level agreement which is changed automatically and the change requires that network providers have access to additional specific management products associated with the user network and specific data in those products such as the end-to-end vs. component latency/jitter parameters in the adjustment of those parameters.

4. Convert to Specific Methods

The present invention provides for the ability to convert management control settings to the specific control and parameter settings for the different management methods. For example, the maximum number of messages on the network for any given period of time can be set to a value.

5. Control Sets

The present invention provides for the ability to transfer the control settings in such a way so as to immediately effect the operation of the management system. As explained above, FIG. 1 illustrates the flow for implementing the management access privilege associated with a network management system according to the present invention. FIGS. 3 and 4 illustrate the block diagrams for the master control module and network interconnection module forming part of the bandwidth monitoring devices which are deployed in the network in association with the director console so as to implement the flow chart shown in FIG. 1. The details concerning the director console architecture presented in FIGS. 6–13.

In summary, what is described is the ability of a management system to automatically control multiple management system users as well as management access and privileges based upon the current status of service level agreements. It is further directed to the ability of that management system to automatically adjust the service level agreements based on the current characterization baseline of the network as measured by the process, thus requiring the management to adjust privileges based on the newly defined service level agreements. It is further directed to the ability of the management system to automatically adjust access privileges with respect to network management based on the current measured status of the network.

Having described the invention, what is claimed is:

1. A method of automatically identifying and setting the level of management access privilege that is given to any one network management system in a multiple management system environment, where network bandwidth and service types are provided by one or more service level agreements (SLAs), comprising the steps of:
   1) monitoring multiple components of the network so as to identify the current status of multiple service level agreements;
   2) determining the current scale and scope of the network; and
   3) automatically adjusting a service level agreement based on the current scale and scope of the network in view of the status of the multiple service level agreements.

2. A method of automatically identifying and setting the level of management access privilege that are given to any one network management system in a multiple management system as defined in claim 1, further comprising the step of automatically adjusting the management access privilege based on the current determined scale and scope of the network.

3. A method of automatically identifying and setting the level of management access privilege that are given to any one network management system in a multiple management system as defined in claim 2, wherein the management access privilege includes the rate at which data is received.

4. A method of automatically identifying and setting the level of management access privilege that are given to any one network management system in a multiple management system as defined in claim 2, wherein the management access privilege includes the type of data that can be accessed.

5. A method of automatically identifying and setting the level of management access privilege that are given to any one network management system in a multiple management system as defined in claim 2, wherein the scale and scope of the network includes information regarding the end-to-end transfer of information from a source to a destination.

6. A method of automatically identifying and setting the level of management access privilege that are given to any one network management system in a multiple management system as defined in claim 2, wherein the scale and scope of the network includes information regarding the transfer of information from component to component within the network.

7. A method of automatically identifying and setting the level of management access privilege that are given to any one network management system in a multiple management system as defined in claim 1, wherein the scale and scope of the network includes information regarding the end-to-end transfer of information from a source to a destination.

8. A method of automatically identifying and setting the level of management access privilege that are given to any one network management system in a multiple management system as defined in claim 1, wherein the scale and scope of the network includes information regarding the transfer of information from component to component within the network.

9. A method of automatically identifying and setting the level of management access privilege that are given to any one network management system in a multiple management system as defined in claim 1, further comprising the step of:
   configuring the initial level of management access privilege for a given network management system.

10. A method of automatically identifying and setting the level of management access privilege that is given to any one network management system in a multiple management system as defined in claim 1, further comprising the step automatically adjusting the management access privilege.

11. A method of automatically identifying and setting the level of management access privilege that is given to any one network management system in a multiple management system as defined in claim 10, wherein the automatic adjusting of the managment access privilege is based upon the automatic adjusting of said service level agreement.

12. A method of automatically identifying and setting the level of management access privilege that is given to any one network management system in a multiple management system as defined in claim 11, wherein the management access privilege includes the rate at which data is received.

13. A method of automatically identifying and setting the level of management access privilege that is given to any one network management system in a multiple management system as defined in claim 11, wherein the management access privilege includes the type of data that can be accessed.

14. A method of automatically identifying and setting the level of management access privilege that is given to any one network management system in a multiple management system as defined in claim 11, wherein the scale and scope of the network includes information regarding the end-to-end transfer of information from a source to a destination.

15. A method of automatically identifying and setting the level of management access privilege that is given to any one network management system in a multiple management system as defined in claim 11, wherein the scale and scope of the network includes information regarding the transfer of information from component to component within the network.

16. A method of automatically identifying and setting the level of management access privilege that is given to any one network management system in a multiple management system as defined in claim 11, wherein the scale and scope of the network includes information regarding the transfer of information from component to component within the network.

17. A method of automatically identifying and setting the level of management access privilege that is given to any one network management system in a multiple management system as defined in claim 10, wherein the management access privilege includes the rate at which data is received.

18. A method of automatically identifying and setting the level of management access privilege that is given to any one network management system in a multiple management system as defined in claim 10, wherein the management access privilege includes the type of data that can be accessed.

19. A method of automatically identifying and setting the level of management access privilege that is given to any one network management system in a multiple management system as defined in claim 10, wherein the scale and scope of the network includes information regarding the end-to-end transfer of information from a source to a destination.

* * * * *